No. 741,104. PATENTED OCT. 13, 1903.
D. C. BOWERS.
HARNESS SADDLETREE.
APPLICATION FILED DEC. 30, 1902.
NO MODEL.
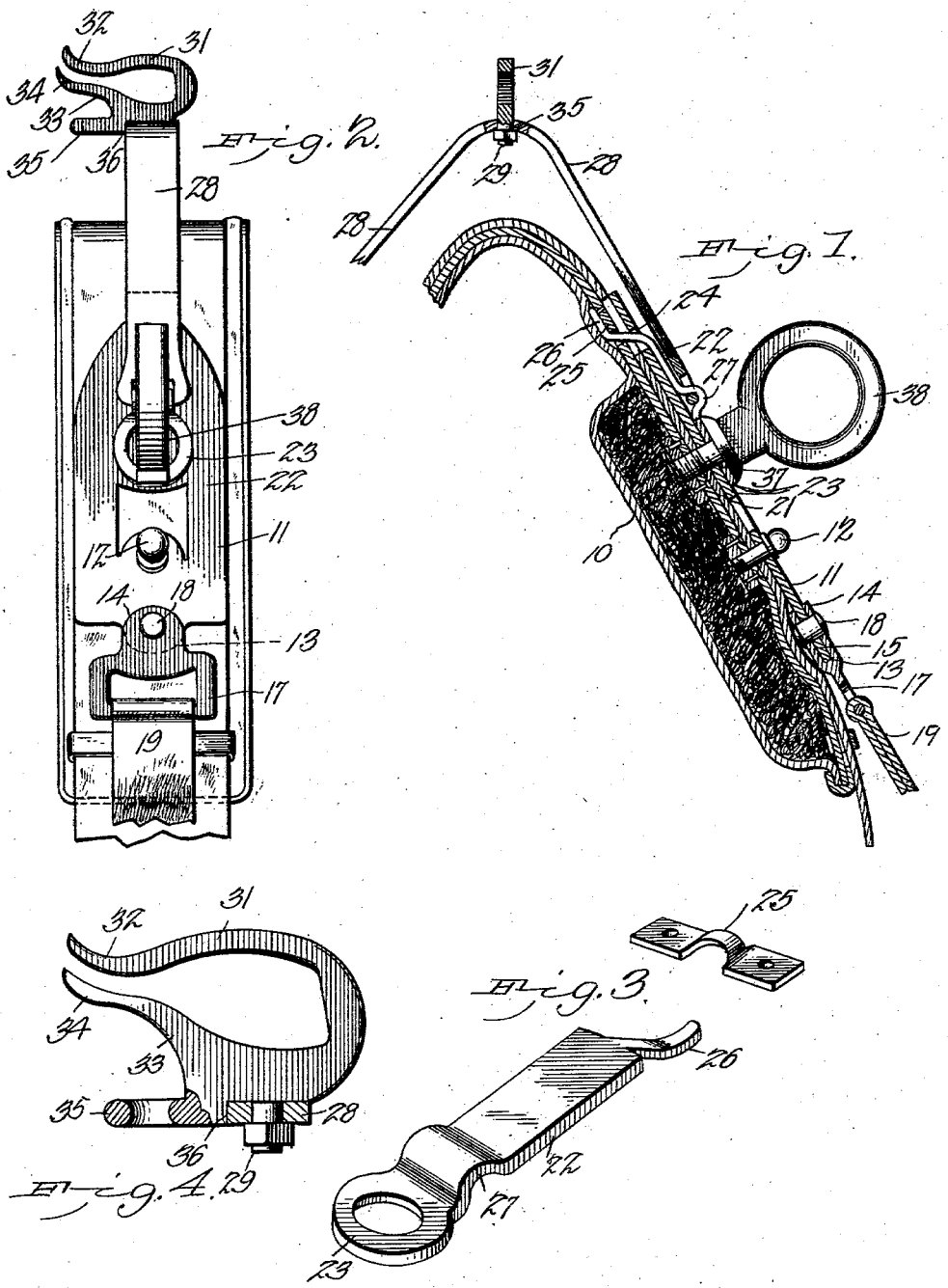

No. 741,104. Patented October 13, 1903.

UNITED STATES PATENT OFFICE.

DOCTOR COPE BOWERS, OF CHELSEA, INDIAN TERRITORY.

HARNESS-SADDLETREE.

SPECIFICATION forming part of Letters Patent No. 741,104, dated October 13, 1903.

Application filed December 30, 1902. Serial No. 137,180. (No model.)

*To all whom it may concern:*

Be it known that I, DOCTOR COPE BOWERS, a citizen of the United States, residing at Chelsea, in the county of Cherokee, Indian Territory, have invented a new and useful Harness-Saddletree, of which the following is a specification.

This invention relates to the saddletree portions of harness, and has for its object the production of a simply-constructed and easily-applied device whereby the parts are rendered automatically adjustable and yieldable to obviate undue strains and prevent breakage or fracture of the parts; and the invention consists in certain novel features, as hereinafter described and claimed.

In the drawings illustrative of the invention, in which corresponding parts are denoted by like designating characters, Figure 1 is a vertical sectional elevation. Fig. 2 is a side elevation. Fig. 3 represents enlarged detached perspective views of the keeper-plate and keeper-loop. Fig. 4 is an enlarged sectional detail of the checkrein-hook and its connections.

The device may be applied to any of the various sizes and forms of harness or to any of the various forms and sizes of harness-pads, and for the purpose of illustration the device is shown applied to harness-pads 10 of the usual construction.

One of the improved devices will be employed upon each of the pads; but as they are precisely alike one only is shown for the purpose of illustration.

The improved device consists of a saddle-plate 11 of any suitable material, preferably sheet or malleable metal, and connected at one point to the saddle, as by a screw-bolt 12, whose nut is attached, as by rivets, to the under side of the pad-top, as shown, the screw-fastener being preferably located near the lower end of the plate and firmly holding the plate 11 to the pad. Extending from the lower extremity of the plate 11 is an ear 13, embraced upon opposite sides by spaced lugs 14 15, extending from a transverse coupling 17, the three parts being connected by a pivot bolt or rivet 18, as shown. The "pad-skirt" straps 19 will be connected to the couplings 17, as shown in Figs. 1 and 2, the skirt-straps being thus free to swing laterally relative to the plate 11, as will be obvious, so that the pad-skirt will readily adjust itself automatically and yield to lateral strains and prevent any breakage or undue strains.

The plate members 11 will be large enough to extend over a comparatively large surface, and will thus effectually prevent unequal wear between the parts by distributing the strains over a wider area and effectually preventing the "cupping" of the housing or getting out of order.

The plates 11 will be provided with intermediate apertures, in which the shanks 37 of the terrets 38 will be secured to the under sides of the pad-top by means of a nut 21, attached, as by rivets, to the under side of the pad-top, as shown.

Upon the upper surface of the plate 11 is arranged a keeper-plate 22, the latter having an eye 23 upon one end embracing the shank of the terret between the plate and the shoulders of the terret, as shown, so that the terrets form the means for coupling one end of the keeper-plate to the saddle-plate.

The saddle-plate 11 is provided with an aperture 24 near its upper end, and embedded within the saddle-pad adjacent to the aperture is a keeper-loop 25, as shown.

The upper end of the keeper-plate 22 is formed with a hook 26 extending therefrom and turned into alinement with the general surface of the plate 11 and adapted to be inserted through the aperture 24 and engage the keeper-loop 25, and thus form a means for coupling the keeper-plate, saddle-plate, and saddle-pad together, as will be obvious.

The hook 26 will be so formed that when inserted through the aperture 24 and engaged with the keeper-loop 25 and the eye portion 23 engaged by the terret 38 it will exert a straining force to forcibly draw the parts together, and thus firmly clamp and bind the saddle-pad, saddle-plate, and keeper-plate into engagement. By this means the saddle-plates are firmly connected to the saddle-pads by one screw only in each, and when they are to be detached it is only necessary to detach one screw in each plate. This is an important feature of the invention and greatly simplifies the construction and materially reduces the expense.

Each of the keeper-plates 22 is formed with a loop 27, with which apertures in the ends of a yoke 28 movably engage, the yoke connecting the two parts over the back of the horse. The shank portion 29 of the checkrein-hook is connected centrally of the yoke 28, as by a nut or other suitable means.

The checkrein-hook is formed of the main hook member 31, curving backwardly and terminating in a downwardly reversely curving portion 32, and a guard-hook member 33, terminating in a curved portion 34, corresponding to and spaced from the curved portion 32, whereby the inlet to the hook is formed with a relatively short curved channel, so that it will be necessary to turn the check-strap sidewise to insert or remove it—a position it would never assume when in use. By this simple means the accidental removal of the checkrein will be obviated, as it cannot be removed unless placed in an unusual position, as above noted.

The back-strap loop 35 extends from the base of the checkrein-hook and is formed with a shoulder 36, adapted to engage the side of the yoke 28, and thus materially assist in supporting the parts and preventing lateral movement to the hook portion. By this arrangement of the parts a very simple, compact, and cheaply-constructed device is produced which may be readily applied to any construction of harness and will very readily adapt itself to the various changes of position of the horse or to different sizes and forms of horses without wrenching or unduly straining the parts, as the joints will yield to pressure and strains from different directions without breaking or fracturing the parts.

The plates 11, bars 28, and keeper-plates will preferably be "struck up" from sheet metal of suitable gage to withstand the strains to which they will be subjected and may be of any desired shape to conform to the other portions of the harness and may be in any suitable fanciful design or configuration and may be plated, japanned, or otherwise coated or protected, as desired.

Having thus described my invention, what I claim is—

In a harness, the combination with connected saddle-pads, each having a keeper-loop and threaded nuts embedded therein, of pad-trees, each composed of a plate provided with an aperture at one end and a perforated ear at the other and having intermediate perforations, a screw-bolt passing through one of said intermediate perforations and engaging one of said saddle-carried nuts, a keeper-plate having an eye at one end and a deflected tongue at its other end and provided with an intermediate yoke-engaging loop, a terret passing through said keeper-eye and through one of said intermediate perforations of said tree-plate and engaging another saddle-carried nut, the tongue of said keeper extending through the end aperture of said tree-plate and engaging said saddle-carried keeper-loop, and a skirt-strap coupling having a bifurcated end for embracing said perforated tree-plate ear and movably connected therewith.

In testimony that I claim the foregoing as my own I have hereto affixed my signature in the presence of two witnesses.

DOCTOR COPE BOWERS.

Witnesses:
OSCAR L. ANDERSON,
WILLIAM E. BISHOP.